United States Patent Office 3,260,714
Patented July 12, 1966

3,260,714
QUATERNARY AMMONIUM SALTS OF LINCOMYCIN
William Schroeder, Pavilion Township, Kalamazoo County, Mich., assignor to The Upjohn Company, Kalamazoo, Mich., a corporation of Delaware
No Drawing. Filed May 14, 1964, Ser. No. 367,572
2 Claims. (Cl. 260—210)

This invention relates to novel compositions of matter and to a process for the preparation thereof, and is particularly directed to novel quaternary ammonium salts of lincomycin and to a process for producing the same.

Lincomycin is an antibiotic obtained as an elaboration product of a lincomycin-producing actinomycete. Methods for the production, recovery, and purification of lincomycin are described in U.S. Patent 3,086,912.

The novel compounds according to this invention are lincomycin quaternary ammonium salts (I). Subsequent to this invention the structure of lincomycin has been elucidated. The novel compounds of the invention, therefore, can now be represented by the following formula:

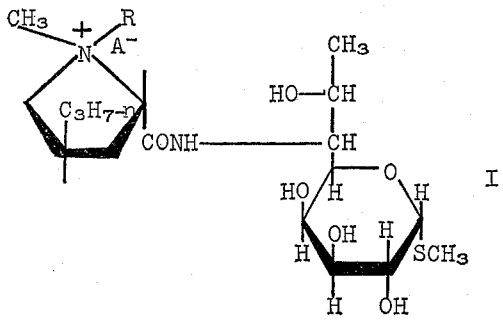

wherein R is alkyl, e.g., methyl, ethyl, propyl, butyl, amyl, hexyl, heptyl, octyl, lauryl, pentadecyl, octadecyl, and the like, and the isomeric forms thereof; and wherein $A^-$ is an anion selected from the group consisting of monovalent organic and inorganic anions, e.g., chloride, bromide, iodide, bisulfate, acetate, propionate, lactate, and the like.

The novel compounds of the invention, lincomycin quaternary ammonium salts, have antibacterial activity. For example, lincomycin methiodide is active against *Staphylococcus albus*, *Staphylococcus aureus*, and *Streptococcus faecalis*. Therefore, these compounds can be used alone or in combination with other antibacterial or antifungal agents to prevent the growth or reduce the number of susceptible organisms present in various environments, for example, in plants and in animals, such as mammals, birds, fish, reptiles, and humans.

Some lincomycin quaternary ammonium salts of Formula I are formed by reacting lincomycin with a quaternizing agent, for example, an alkyl halide. Other quaternary ammonium salts of Formula I are produced by reacting a compound of Formula I, wherein $A^-$ is a halogen, with silver hydroxide and reacting the thus-obtained quaternary ammonium hydroxide with an acid. The anion of the quaternary ammonium salt can be inorganic, for example, chloride, bromide, iodide, nitrate, sulfate, phosphate, thiocyanic, fluosilicate, perchlorate, and the like, or it can be organic, for example, methanesulfonate, p-toluenesulfonate, 1-naphthalenesulfonate, acetate, benzoate, salicylate, cinnamate, hemisuccinate, lactate, or the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof.

The reaction can be conducted, conveniently, at room temperature, advantageously, in the presence of a inert liquid diluent, for example, an alcohol or an organic halide (methylene chloride is preferred). The proportions of reactants can be varied; however, it is desirable to employ at least an equimolar proportion of the reactants or an excess of about 15 fold of the quarternizing agent. Such excess can serve as a solvent for the reactants, thus favoring the reaction while not substantially complicating the isolation of the quaternary ammonium salt. The reaction is usually completed in from a few minutes to several hours.

The quaternary ammonium salt can be isolated from the reaction mixture by first concentrating the mixture, dissolving the concentrate in a lower alkanol, for example, methanol, and then precipitating the salt by the addition of a solvent, for example, ether, ethyl acetate, and the like. Any solvent which will lower the solubility of the salt in the solution can be used. If desired, the salt can be further purified by redissolving in a lower alkanol and then reprecitating the salt by a solvent as above.

Lincomycin quaternary ammonium salts have antibacterial activity as shown in the following table. The antibacterial spectrum was determined by using a tube dilution assay procedure with the media BHI (Brain Heart Infusion broth, Difco, Detroit, Michigan). Assay tubes (18 x 150 mm.) were prepared in the customary manner as set out in Snell, E. E., Vitamin Methods, vol. I, Academic Press, Inc., New York 1950, p. 327. Test organisms grown for 18 hours at 37° C. were used to inoculate the test medium.

ANTIBACTERIAL ACTIVITY OF LINCOMYCIN METHIODIDE

| Test organism | M.I.C.* ($\gamma$/ml.) |
|---|---|
| *Staphylococcus albus* UC 925 | 200 |
| *S. albus* ATCC 151 | 25 |
| *Staphylococcus aureus* UC 80 | 100 |
| *S. aureus* UC 552 | 200 |
| *S. aureus* UC 771 | 200 |
| *Streptococcus faecalis* UC 157 | 100 |

*M.I.C.=minimum inhibitory concentration.
NOTE: The UC prefix refers to The Upjohn Culture Collection. These organisms are available from the Upjohn Company on request.

The novel compounds can be used as disinfectants on various dental and medical equipment contaminated with *Staphylococcus aureus*; they can also be used as disinfectants on washed and stacked food utensils contaminated with *Staplylococcus aureus* and *Streptococcus faecalis*. Further, the novel lincomycin quaternary ammonium salts can be converted to fluosilicic acid salts which are useful as mothproofing agents according to U.S. Patents 1,915,334 and 2,075,359.

The higher alkyl quaternary ammonium salts, for example, those wherein the alkyl group is from 9 to 20 atoms, inclusive, exhibit valuable wetting and emulsifying properties. These higher quaternary ammonium salts are useful as detergents and detergent-santizers and can be employed to clean and sanitize equipment used in the processing and preparation of foods, for example, fruit, meat, milk, and the like.

The following example is illustrative of the process and products of the present invention, but is not to be construed as limiting.

EXAMPLE 1

Lincomycin methiodide

A solution of 3.4 g. of lincomycin base in a mixture of 5 ml. of methylene chloride and 5 ml. of methyl iodide was allowed to stand at room temperature for 30 minutes and then swirled occasionally for an additional 30 minutes. The methylene chloride and excess methyl iodide were removed in vacuo and the residue was dissolved in methanol. The resulting solution was poured into ethyl acetate (50 ml.) and lincomycin methiodide was obtained as a gummy precipitate. The liquid phase was decanted. The remaining gum was dissolved in methanol, and ether was added to precipitate lincomycin methiodide as a white amorphous powder; the yield after drying at room temperature in vacuo was 2.4 gm.

*Analysis.*—Calcd. for $C_{19}H_{37}IN_2O_6S \cdot H_2O$: C, 40.28; H, 6.89; N, 4.95; S, 5.65; I, 22.41. Found: C, 40.16; H, 6.62; N, 4.68; S, 5.52; I, 22.83.

By substituting the methyl iodide in the above process by other alkyl halides wherein the alkyl is up to 20 carbon atoms, inclusive, and wherein the halogen of the halide is selected from the group consisting of bromine, chlorine, and iodine, the corresponding quaternary ammonium salts are obtained.

I claim:
1. A compound of the formula:

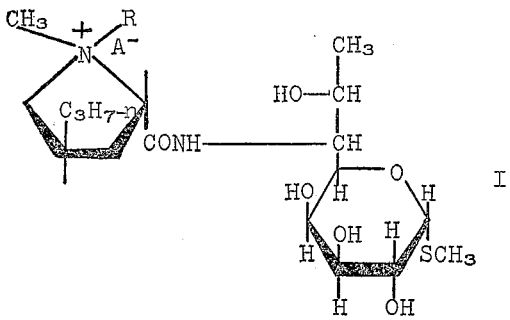

wherein R is alkyl containing up to and including 20 carbon atoms; and wherein $A^-$ is a halide radical.

2. Lincomycin methiodide.

References Cited by the Examiner

UNITED STATES PATENTS 3,152,115   10/1964   Morel et al. _____ 260—211

LEWIS GOTTS, *Primary Examiner.*
JOHNNIE R. BROWN, *Assistant Examiner.*